(12) United States Patent
Agrawal et al.

(10) Patent No.: US 9,239,843 B2
(45) Date of Patent: Jan. 19, 2016

(54) SCALABLE DE-DUPLICATION FOR STORAGE SYSTEMS

(75) Inventors: Mukund Agrawal, Pune (IN); Srineet Sridharan, Pune (IN)

(73) Assignee: Symantec Corporation, Mountain View, CA (US)

(*) Notice: Subject to any disclaimer, the term of this patent is extended or adjusted under 35 U.S.C. 154(b) by 673 days.

(21) Appl. No.: 12/638,907

(22) Filed: Dec. 15, 2009

(65) Prior Publication Data

US 2011/0145207 A1 Jun. 16, 2011

(51) Int. Cl.
*G06F 17/30* (2006.01)

(52) U.S. Cl.
CPC .... *G06F 17/30159* (2013.01); *G06F 17/30156* (2013.01)

(58) Field of Classification Search
CPC ............... G06F 17/30156; G06F 17/30159
USPC .......................................... 707/692, E17.002
See application file for complete search history.

(56) References Cited

U.S. PATENT DOCUMENTS

| | | | | |
|---|---|---|---|---|
| 6,067,444 | A  * | 5/2000 | Cannon et al. | 340/7.44 |
| 6,928,526 | B1 * | 8/2005 | Zhu et al. | 711/154 |
| 2005/0076031 | A1* | 4/2005 | Xu et al. | 707/9 |
| 2007/0043757 | A1* | 2/2007 | Benton et al. | 707/102 |
| 2009/0171990 | A1* | 7/2009 | Naef, III | 707/100 |
| 2010/0042790 | A1* | 2/2010 | Mondal et al. | 711/161 |
| 2010/0257403 | A1* | 10/2010 | Virk et al. | 714/15 |
| 2011/0125719 | A1* | 5/2011 | Jayaraman | 707/692 |
| 2012/0109976 | A1* | 5/2012 | Beaudet | 707/750 |

* cited by examiner

*Primary Examiner* — Shiow-Jy Fan
(74) *Attorney, Agent, or Firm* — Wilmer Cutler Pickering Hale and Dorr LLP

(57) ABSTRACT

A method for performing storage system de-duplication. The method includes accessing a plurality of initial partitions of files of a storage system and performing a de-duplication on each of the initial partitions. For each duplicate found, an indicator comprising the metadata that is similar across said each duplicate is determined. For each indicator, indicators are determined that infer a likelihood that data objects with said indicators contain duplicate data is high. Optimized partitions are generated in accordance with the chosen indicators. A de-duplication process is subsequently performed on each of the optimized partitions.

20 Claims, 12 Drawing Sheets

SCALABLE DE-DUPLICATION FOR STORAGE SYSTEMS

FIELD OF THE INVENTION

The present invention is generally related to digital computer systems.

BACKGROUND OF THE INVENTION

Data de-duplication (often called "intelligent compression" or "single-instance storage") is a method of reducing storage needs by eliminating redundant data. Only one unique instance of the data is actually retained on storage media, such as disk or tape. Redundant data is replaced with a pointer to the unique data copy. For example, a typical email system might contain 100 instances of the same one megabyte (MB) file attachment. If the email platform is backed up or archived, all 100 instances are saved, requiring 100 MB storage space. With data de-duplication, only one instance of the attachment is actually stored; each subsequent instance is just referenced back to the one saved copy. In this example, a 100 MB storage demand could be reduced to only one MB.

Data de-duplication offers other benefits. Lower storage space requirements will save money on disk expenditures. The more efficient use of disk space also allows for longer disk retention periods, which provides better recovery time objectives (RTO) for a longer time and reduces the need for tape backups. Data de-duplication also reduces the data that must be sent across a WAN for remote backups, replication, and disaster recovery.

Data de-duplication can generally operate at the file, block, and even the bit level. File de-duplication eliminates duplicate files (as in the example above), but this is not a very efficient means of de-duplication. Block and bit de-duplication looks within a file and saves unique iterations of each block or bit. Each chunk of data is processed using a hash algorithm such as MD5 or SHA-1. This process generates a unique number for each piece which is then stored in an index. If a file is updated, only the changed data is saved. That is, if only a few bytes of a document or presentation are changed, only the changed blocks or bytes are saved, the changes don't constitute an entirely new file. This behavior makes block and bit de-duplication far more efficient. However, block and bit de-duplication take more processing power and uses a much larger index to track the individual pieces.

However, there are significant performance problems with conventional de-duplication schemes as the amount of data being stored continues to grow. For example, as the amount of data being stored within a given data storage system continues to expand, the mechanisms supporting conventional de-duplication schemes (e.g., the indexes) cannot adequately scale to meet the additional needs. For example, when the indexes are too large to be cached entirely into memory/RAM, lookups on the indexes incur one or more disk accesses, and this slows down write and read access to the de-duplication store significantly. The indexes used by conventional de-duplication schemes are proving to be severe limits on the ability of such schemes to handle large data sets. The conventional de-duplication schemes cannot scale to handle the many petabytes of data being generated by today's enterprises.

SUMMARY OF THE INVENTION

Embodiments of the present invention can implement highly scalable de-duplication processes for storage systems.

In one embodiment, the present invention comprises a computer implemented method for performing storage system de-duplication. The method includes accessing a plurality of initial partitions of files of a storage system and performing a de-duplication on each of the initial partitions. For each duplicate found, an indicator comprising the metadata that is similar across said each duplicate is determined. For each indicator, indicators are determined that infer a likelihood that data objects with said indicators contain duplicate data is high. Indicators having high such ratios are designated as chosen indicators. Optimized partitions are generated in accordance with the chosen indicators. A de-duplication process is subsequently performed on each of the optimized partitions.

In one embodiment, the plurality of initial partitions are randomly selected partitions of files of the storage system.

In one embodiment, the chosen indicators enable the generation of optimized partitions in a plurality of different directions across the files of the storage system.

In one embodiment, Boolean operations are used to combine chosen indicators to generate optimized partitions.

In one embodiment, optimized partitions are generated iteratively to detect duplicates within the files of the storage system.

In one embodiment, the de-duplication performed on each of the optimized partitions is performed out of band with respect to the storage system.

In one embodiment, the de-duplication performed on each of the optimized partitions is performed in-band with respect to the storage system.

In one embodiment, the present invention is implemented as a computer readable storage medium having stored thereon, computer executable instructions that, if executed by a computer system cause the computer system to perform a de-duplication method. The de-duplication method includes, out of a plurality of partitions of files on a file storage system, accessing a plurality of initial partitions and performing a de-duplication on each of the initial partitions. For each duplicate found, an indicator comprising the metadata that is similar across said each duplicate is determined. For each indicator, a ratio of times said each indicator is common across duplicates to the number of times said each indicator is common across non-duplicates is determined. Indicators having high such ratios are designated as chosen indicators. Optimized partitions are generated in accordance with the chosen indicators. A de-duplication process is subsequently performed on each of the optimized partitions.

In one embodiment, the plurality of initial partitions are user defined partitions of files of the storage system.

In yet another embodiment, the present invention is implemented as a server computer system. The server computer system includes a computer system having a processor coupled to a computer readable storage media and executing computer readable code which causes the computer system to access a plurality of initial partitions of files of a storage system, and perform a de-duplication on each of the initial partitions. for each duplicate found, determine an indicator comprising the metadata that is similar across said each duplicate. For each indicator, the server computer system determines a ratio of times said each indicator is common across duplicates to the number of times said each indicator is common across non-duplicates, wherein indicators having high such ratios are designated as chosen indicators. The server computer system generates optimized partitions in accordance with the chosen indicators, and performs a de-duplication on each of the optimized partitions.

In one embodiment, a plurality of de-duplication indexes for controlling the de-duplication process are allocated across a corresponding plurality of network connected computer systems.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
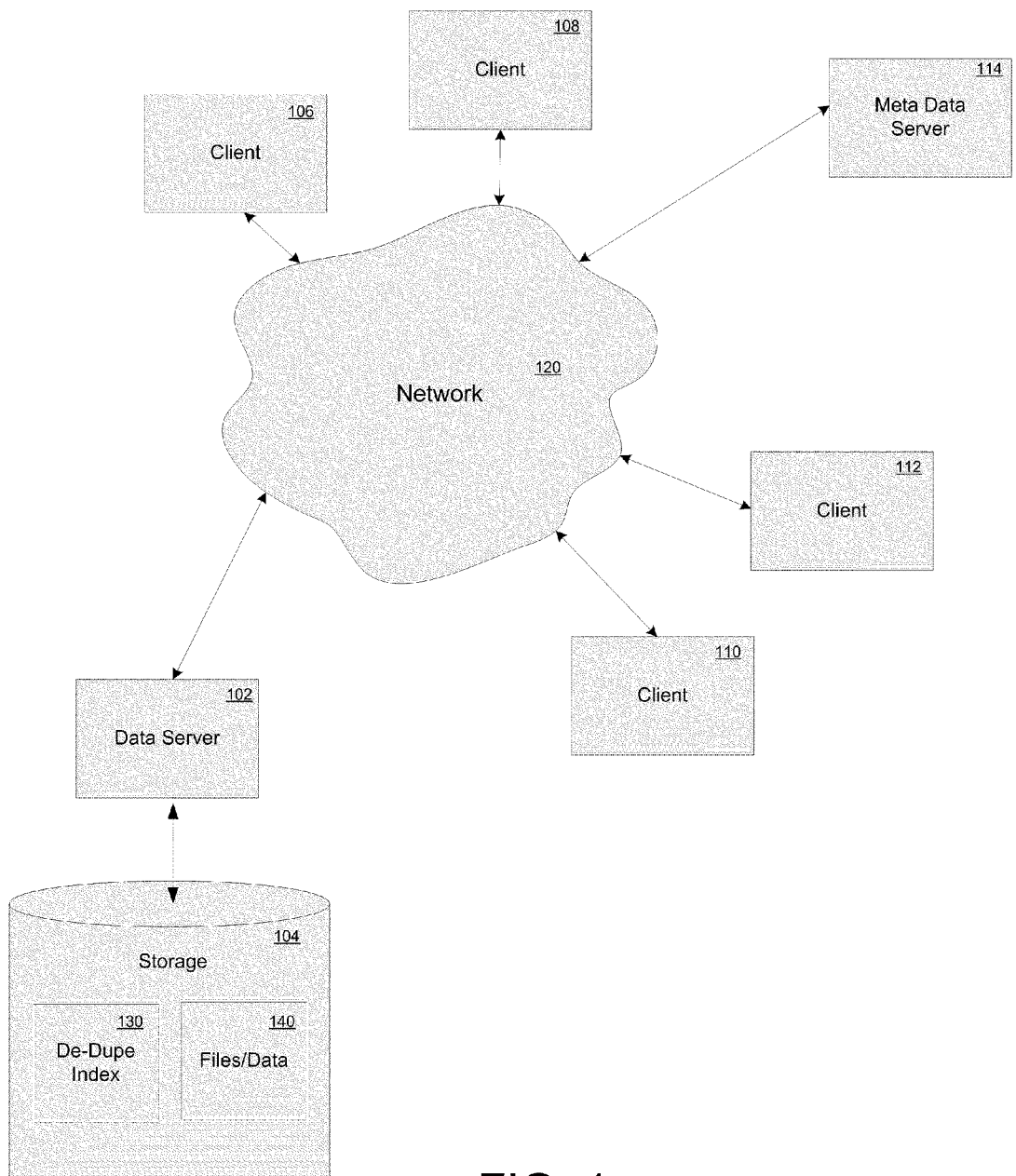
FIG. 1 shows a diagram of an exemplary distributed computer system environment in accordance with one embodiment of the present invention.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "writing" or "storing" or "relocating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Embodiments of the present invention implement a method for performing storage system de-duplication. The method includes accessing a plurality of initial partitions of files of a storage system and performing a de-duplication on each of the initial partitions. For each duplicate found, an indicator comprising the metadata that is similar across said each duplicate is determined. For each indicator, a ratio of times said each indicator is common across duplicates to the number of times said each indicator is common across non-duplicates is determined. Indicators having high such ratios are designated as chosen indicators. Optimized partitions are generated in accordance with the chosen indicators. A de-duplication process is subsequently performed on each of the optimized partitions. An exemplary file system computing node as depicted in FIG. 1 is now described.

FIG. 1 shows a diagram of an exemplary distributed computer system environment in accordance with one embodiment of the present invention. The FIG. 1 embodiment shows an example of a data server computer system 102 accessing a data storage 104. The data server 100 to typically operates one or more file systems that provides data storage and data I/O services to the data server itself and the other client computer systems 106-112 and to a metadata server 114. The data server 102, the metadata server 114 and each of the clients 106-112 are communicatively coupled via the network 120 (e.g., wide-area network, Internet, or the like). FIG. 1 also shows the data storage 104 which stores a de-duplication index 130 and files/data 140 (e.g., stored on a volume, etc.). The de-duplication index 130 and the file/data 140 work in conjunction with a de-duplication manager that executes, in one embodiment, on the data server 102.

Thus, FIG. 1 shows a typical distributed architecture. The clients may be user machines. Master/meta-data server 114 may be a backup master server that schedules backup jobs, or in case of a file-system, it could be a server that stores metadata for all files. The Data server 102 is a server that typically talks to disk storage in any of a number of different architectures. It could be a media server in case of backups, or an archival server of file system server that stores data and/or data volumes.

In the FIG. 1 embodiment, the data server 102 hosts a de-duplication manager that implements a target side or out of band de-duplication process or alternatively, an in-band de-duplication process. This process can be used for various storage systems, such as, for example, backup storage, file-systems, archive stores, and the like. The de-duplication process is functional for different levels of granularity. For example, the process can work on data objects such as whole files or sub-file chunk type objects.

Embodiments of the present invention advantageously divide data (e.g., file/data 140) into partitions and execute the de-duplication process across each partition. The partitions are defined based upon metadata that is optimally selected to yield the best de-duplication results. This attribute yields much better de-duplication results than using partitions based upon mere user selection.

In one embodiment, the partitions are selected based upon metadata that indicates the likelihood of achieving exceptional de-duplication results. For example, in one embodiment, good meta-data suitable for partition determination should be such that chances of duplicates across two partitions should be minimal. File-type is one of the best partition meta-data because the possibility of finding duplicates across different file-types is very low. For example, even if the same text may be contained in them, a doc file and a pdf file will give different checksums.

Another meta-data that may be suitable for creating partitions is file-size. File size is good in those cases where, for example, if a large number of documents are created by modifying some base document, most documents will be of nearly same size. Creation time is another good metadata (e.g., a lot of duplicates would be created within a few days of each other). Another good metadata would be author/owner or group of users (e.g., even if the same or modified document is present at different locations, its author will be same). Thus, partitions that are created intelligently can give much better de-duplication results than user created partitions, and avoid many unnecessary comparisons between objects that have very low chances of being duplicates.

It should be noted that by meta-data, it is not meant the classical file-system meta-data. This meta-data may be even tags assigned by users or applications, category names generated by a classifier, or even machine names where documents originated, or applications which created these files, authors of the documents, and the like.

Figure 2:
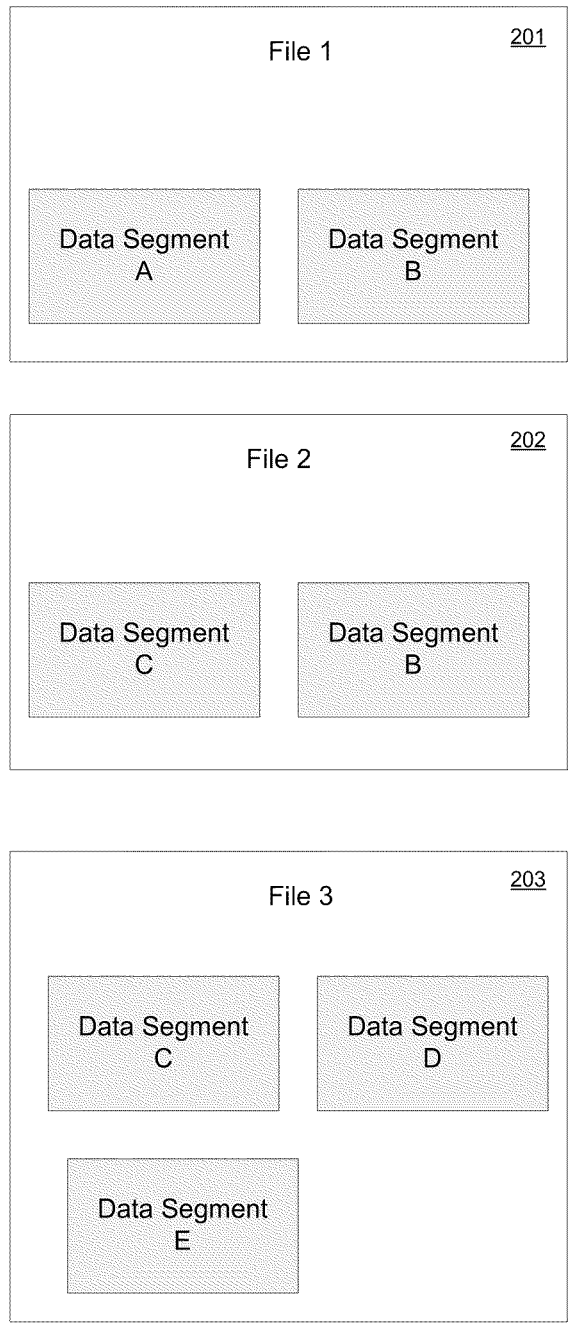
FIG. 2 shows a diagram illustrating three files undergoing de-duplication in accordance with one embodiment of the present invention.

FIG. 2 shows a diagram illustrating three files 201-203 undergoing de-duplication in accordance with one embodiment of the present invention. As depicted in FIG. 2, each of the files 201-203 incorporates data segments which comprise the data of each respective file. Thus, before de-duplication, the files 201-203 are stored within the data storage 104 with each file consisting of its constituent data segments as shown. Hence, storing file 1 and file 2 results in duplicate storage of data segment B. Similarly, storing file 2 and file 3 results in duplicate storage of data segment C.

Figure 3:
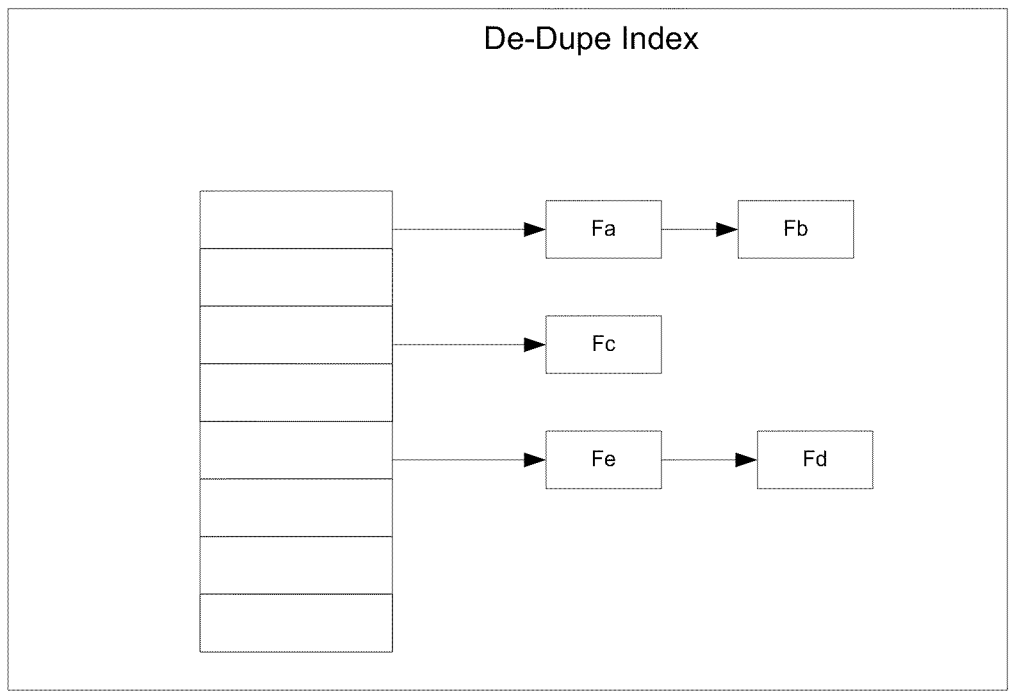
FIG. 3 shows a de-duplication index that contract relationship between the files in accordance with one embodiment of the present invention.

FIG. 3 shows a de-duplication index 300 that can track relationships between the files 201-203 in accordance with one embodiment of the present invention. The de-duplication index 300 functions by maintaining a unique characterization of each of the data segments within the files. In one embodiment, the unique characterization comprises a hash of each data segment comprising the files. In this manner, the unique characterization comprises a "fingerprint" that uniquely identifies an individual data segment and allows the detection of duplicate storage. Hence, as shown in FIG. 3, Fa, Fb, Fc, Fd and Fe are fingerprints of their corresponding data segments.

Figure 4:
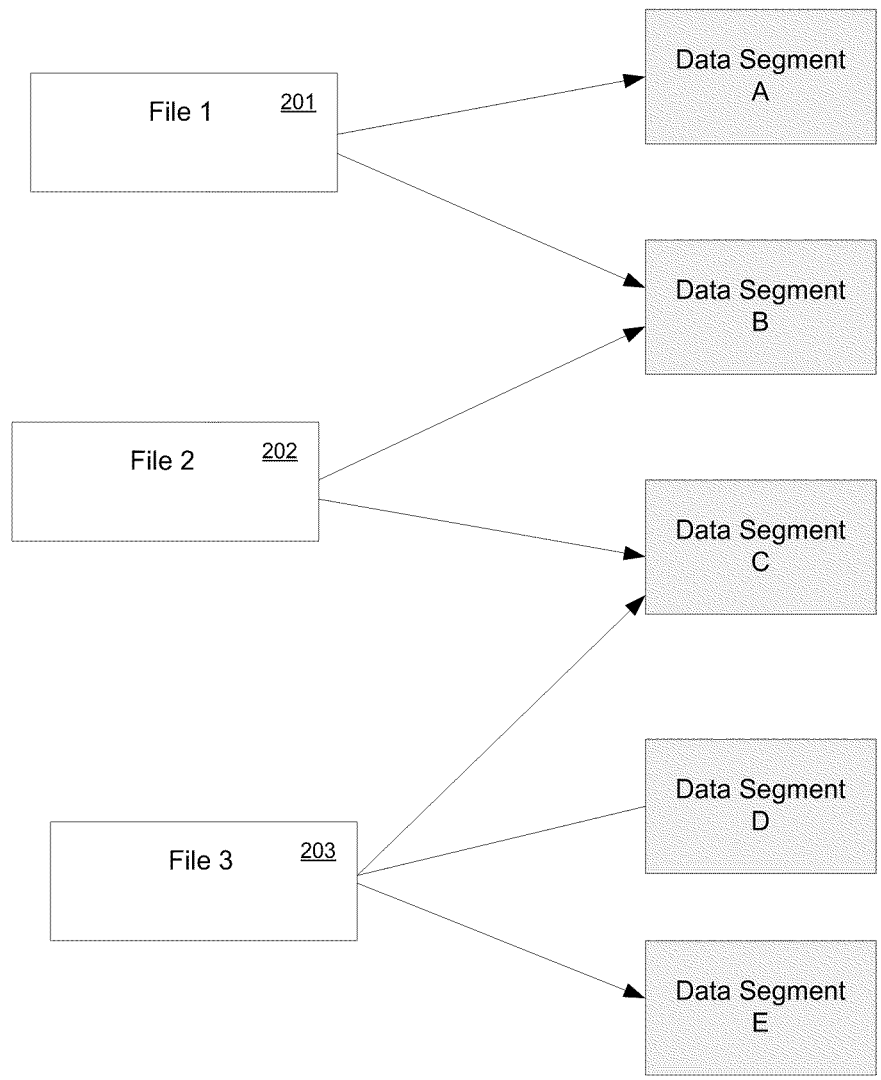
FIG. 4 shows the manner in which the de-duplication process removes the redundant data in accordance with one embodiment of the present invention.

FIG. 4 shows the manner in which the de-duplication process removes the redundant data in accordance with one embodiment of the present invention. In one embodiment, the de-duplication index 300 replaces the data segments comprising the files 201-203 with pointers to a storage location for a unique copy of the data segment. Hence, even though data segment B is shared by file 1 and file 2, it is stored only once. Similarly, even though data segment is shared by file 2 and file 3, it is stored only once. In this manner, duplicated wasted storage is located and eliminated.

Figure 5:
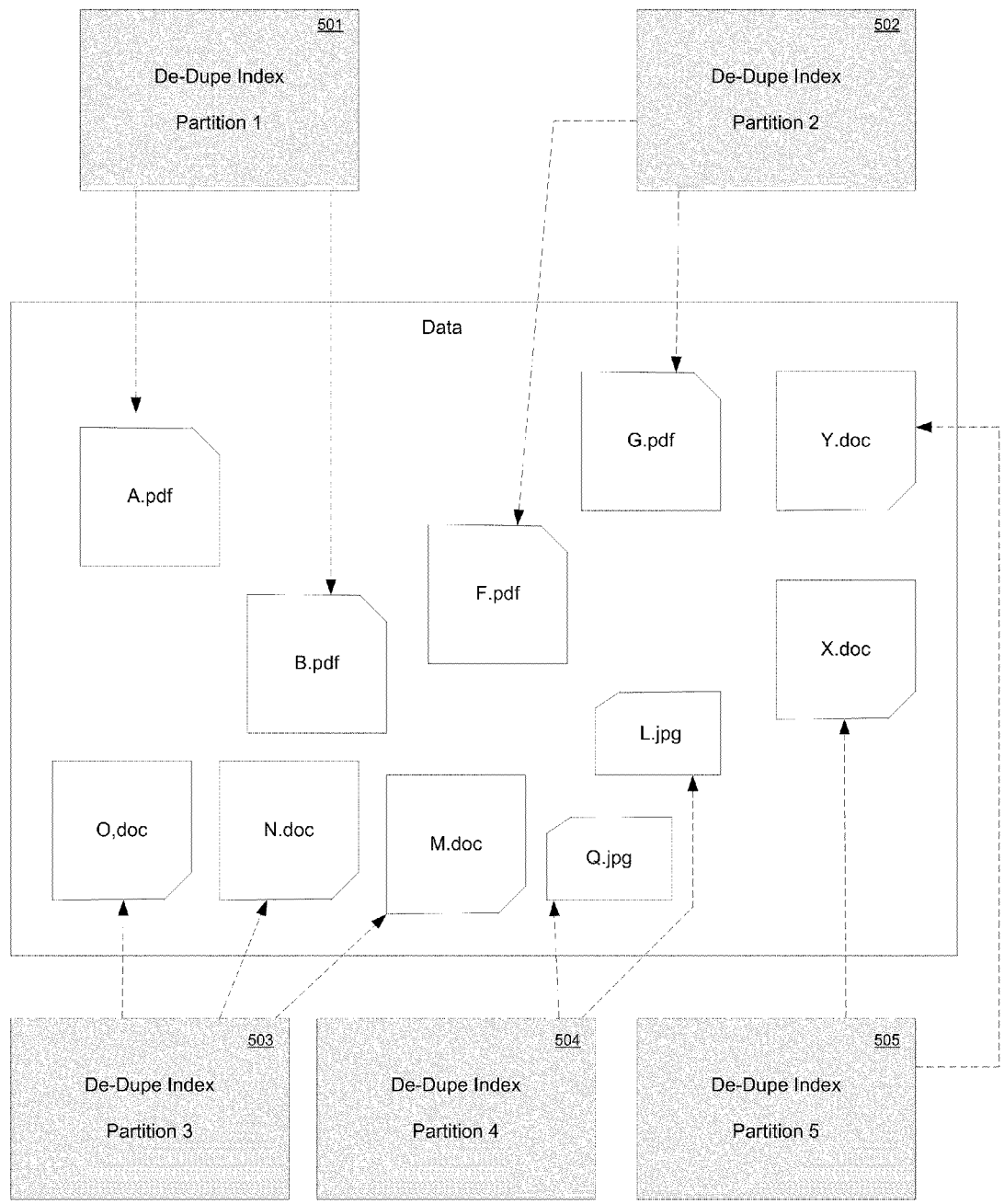
FIG. 5 shows a diagram depicting data partitioned in a number of different ways in accordance with one embodiment of the present invention.

FIG. 5 shows a diagram depicting data partitioned in a number of different directions/ways in accordance with one embodiment of the present invention. As described above, embodiments of the present invention advantageously divide data (e.g., file/data 140) into partitions and execute the de-duplication process across each partition. The partitions are defined based upon metadata that is optimally selected to yield the best de-duplication results. The intelligent selection of metadata that yields optimal de-duplication results also achieves high scalability results. For example, as described above, the file-type may be one of the best suited meta-data, but it typically only yields a scalability of 10-20 times and not 100 times, which would be more desirable. Thus, FIG. 5 shows an example of five different partitions 501-505. Partition 501 could be, for example, those PDF files larger than 2 MB. Partition 502 could be, for example, those PDF files that are smaller than 2 MB. Partition 503 could be, for example, Word document files that are smaller than 800 kB. Partition 504 could be, for example, JPG files of all sizes. Partition 505 could be, for example, Word document files that are larger than 800 kB.

Embodiments of the present invention combine multiple meta-data in a Boolean AND operation to advantageously come up with a larger number of partitions. For example, in one embodiment, for each file-type, the entire size range can be divided into 5 categories: for example into 0-50K, 50K-200K, 200K-1 MB, 1 MB-5 MB, above 5 MB. Thus, if there are 10 different file-types, 50 partitions can be obtained. Similarly, an OR and NOT operation can be implemented, for example, 50% of all files are pdf files, and 50% are doc and text file, and partitions of equal size are desired, so one of the partition definition would be type=txt OR type=doc.

Thus, FIG. 5 illustrates the attribute whereby multiple partitions are created via multiple ways and in multiple directions. In one embodiment, the present invention advantageously creates many different types of partitions in many different types of ways. For example, one way of partition could be based on file-type AND creation time, another partitioning mechanism could be based on file-type AND file-size. Thus, even if files which contain duplicate data may have creation times different by few months, they will still be detected if they have same order of magnitude of file-size. Thus, the more ways we have for creating partitions, the better the chances will be of finding duplicates. In typical usage, beyond 2-3 ways would have found more than 90% of duplicates. Hence, it may be expensive to go beyond 2-3 ways to find the remaining 10% of the duplicates.

Figure 6:
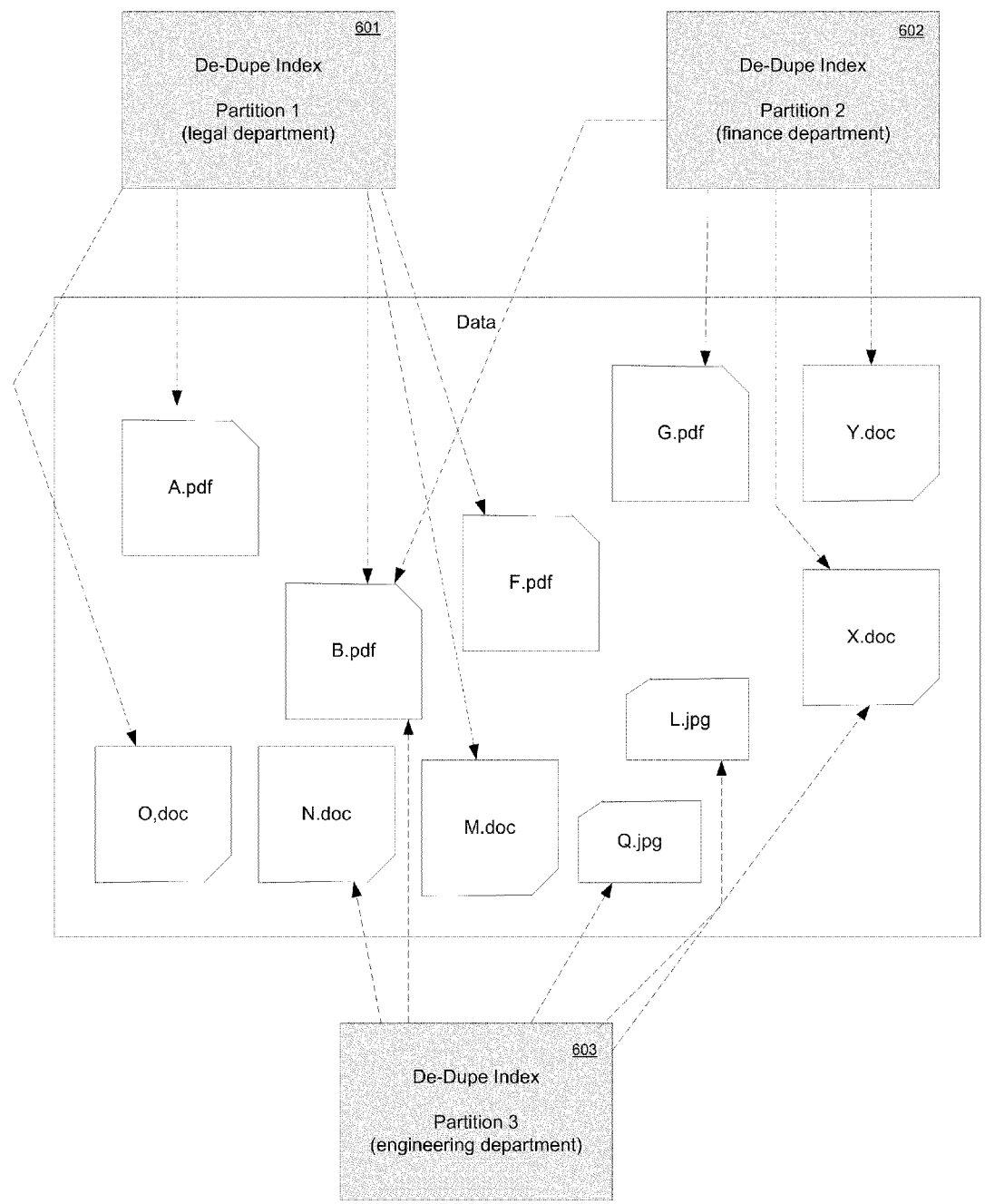
FIG. 6 shows a diagram illustrating an alternative way of defining partitions in accordance with one embodiment of the present invention.

FIG. 6 shows a diagram illustrating an alternative way of defining partitions in accordance with one embodiment of the present invention. As described above, in one embodiment, the present invention advantageously creates many different types of partitions in many different types of ways. Thus, FIG. 6 shows an example of three different partitions 601-603. Partition 601 could be, for example, those files that are stored and used by the legal department. Partition 602 could be, for example, those files that are stored and used by the finance department. Partition 603 could be, for example, files that are stored and used by the engineering department.

Thus, FIG. 5 and FIG. 6 together illustrate a principle whereby partitioning is implemented in multiple directions or dimensions. For example, file A.PDF and file F.PDF may have common data segment regions, but since their sizes were different, the duplicates weren't detected due to the partitioning scheme of FIG. 5. But, by applying another partitioning scheme based on departments as in FIG. 6, the file A.PDF and the file F.PDF fall into same partition, and so duplicates data segments will be eliminated.

Figure 7:
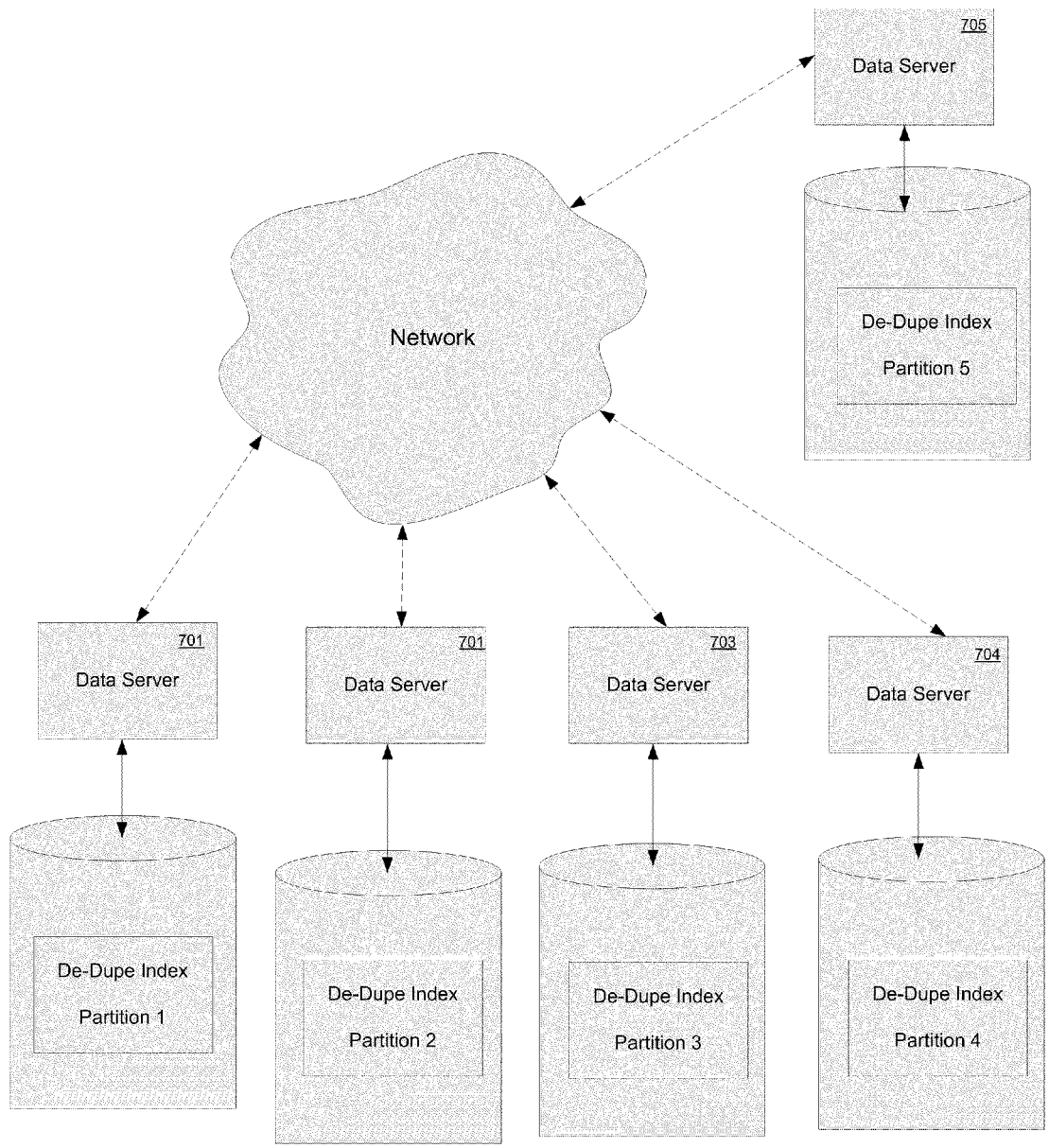
FIG. 7 shows a diagram illustrating a multi-node allocation of partitions in accordance with one embodiment of the present invention.

FIG. 7 shows a diagram illustrating a multi-node allocation of de-duplication indexes in accordance with one embodiment of the present invention. FIG. 7 illustrates the attribute whereby multiple partitions having corresponding multiple de-duplication indexes provides benefits with respect to scaling, where the multiple de-duplication indexes are distributed across the data servers 701-705 as shown. It should be noted that the term "partitions" does not in fact refer to the usual partitioning storage of data. Partitioning as used herein refers to the de-duplication index where each partition of de-duplication index is responsible for performing de-duplication between a subset of files. There may not exist any clear boundary of such a subset of files, etc. In one embodiment, the partitioning refers to a virtual grouping performed within the de-duplication internal data structures. The rest of storage devices, including those responsible for managing allocation of these files, may not be even aware of such partitions.

The attribute of having multiple partitions allows embodiments of the present invention to distribute one or more de-duplication indexes between the various nodes 701-705, in the same manner as information about object locations is distributed between various nodes. This is done to improve performance for object lookups and also so that if one node fails the system does not lose all of the index information. So, even if one node cannot hold the index in memory, 100 nodes could together hold it in memory.

In contrast, for example, consider a conventional scalable storage system like S4™, StarFS™, or Amazon S3™, Microsoft BitVault™ which work with a large number of nodes to serve storage. In such conventional scalable systems which are supposed to store multiple Petabytes of data, if de-duplication were to be implemented, the index would at least be in multiples of tera-bytes, and none of the schemes will scale to that size. If these systems go for random partitions, based on closeness of data hash to node hash, consider what will happen. If one file document.doc were to enter the system, and if it were divided into 200 chunks and if there are 100 nodes, by randomness, each node will have to store 2 hashes. This will be very bad for performance, given that once a suitable node is found for storing the object, all the object data is directly written quickly to that node. But to store the entry into de-duplication index, such a system will have to send messages to all 100 nodes.

However, if such systems are organized in accordance with embodiments of the present invention, where partitions are implemented based on object properties, one node will be assigned to store the de-duplication index just like one node is assigned by object location service to store the object. Thus, with scalable systems, de-duplication can actually be performed in-band, and not out of band as described above. For example, in such an embodiment, the data server 102 of FIG. 1 hosts a de-duplication manager that implements an in-band de-duplication process.

It should be noted that another benefit of distributing partitions between the nodes 701-705 is easy recoverability. If the system has just one de-duplication index, and the system loses even a fraction of it, the system won't know which objects it would need to rescan to build the entire index. This can be much more easily managed with partitions. The system need only scan those objects whose fingerprints were stored in the partition that needs to be recovered.

Figure 8:
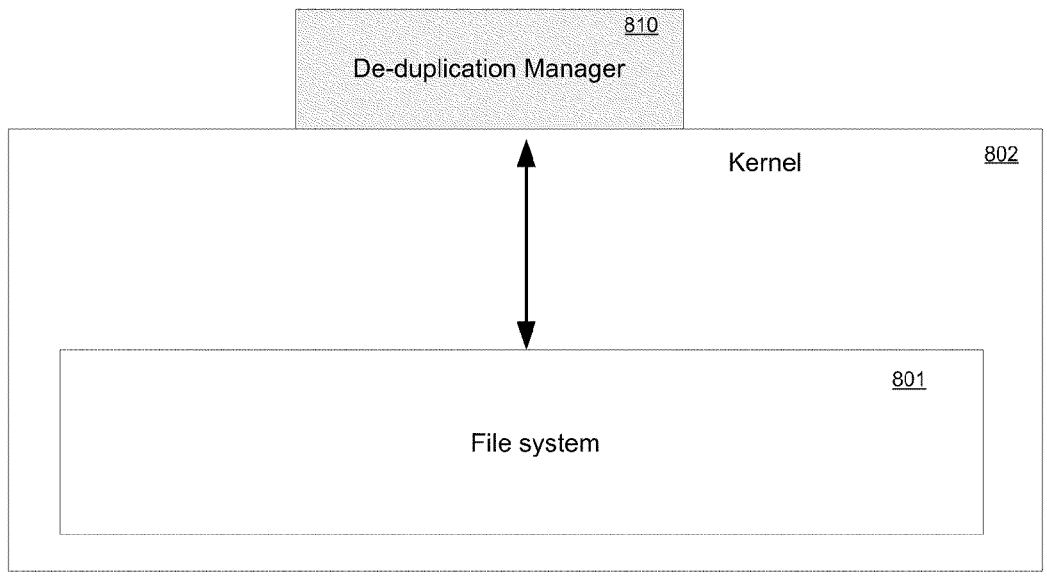
FIG. 8 shows a diagram depicting a de-duplication manager implemented in user address space in accordance with one embodiment of the present invention.

FIG. 8 shows a diagram depicting a de-duplication manager implemented in user address space in accordance with one embodiment of the present invention. In the FIG. 8 embodiment, the de-duplication manager 810 is within application memory space, outside of the protected kernel 802. As shown in FIG. 8, the file system 801 is within kernel space. Thus there is one context switch between user mode and kernel mode as the de-duplication manager interfaces with the file system. In this configuration, the code comprising the file system kernel can be kept in a comparatively stable state. File system kernel code tends to be extensively debugged and extensively tested. This provides great incentives to maintain kernel code stability.

Figure 9:
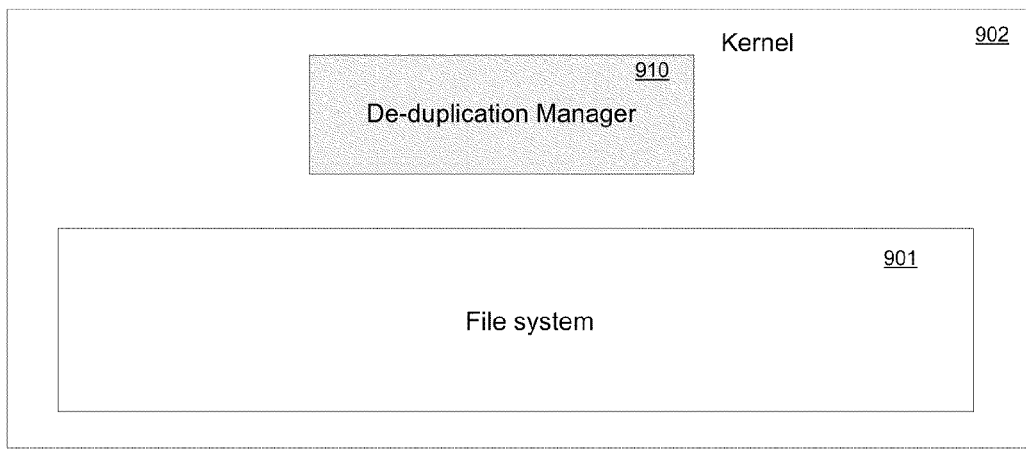
FIG. 9 shows a diagram depicting a de-duplication manager implemented in kernel address space in accordance with one embodiment of the present invention.

FIG. 9 shows a diagram depicting a de-duplication manager implemented in kernel address space in accordance with one embodiment of the present invention. As shown in FIG. 9, both the de-duplication manager 910 and the file system 901 are implemented as user mode components. This configuration provides advantages in that there are no context switches on communication between the de-duplication manager and file system. However, this configuration has disadvantages in that the stability of the kernel and file system code has been disturbed.

Figure 10:
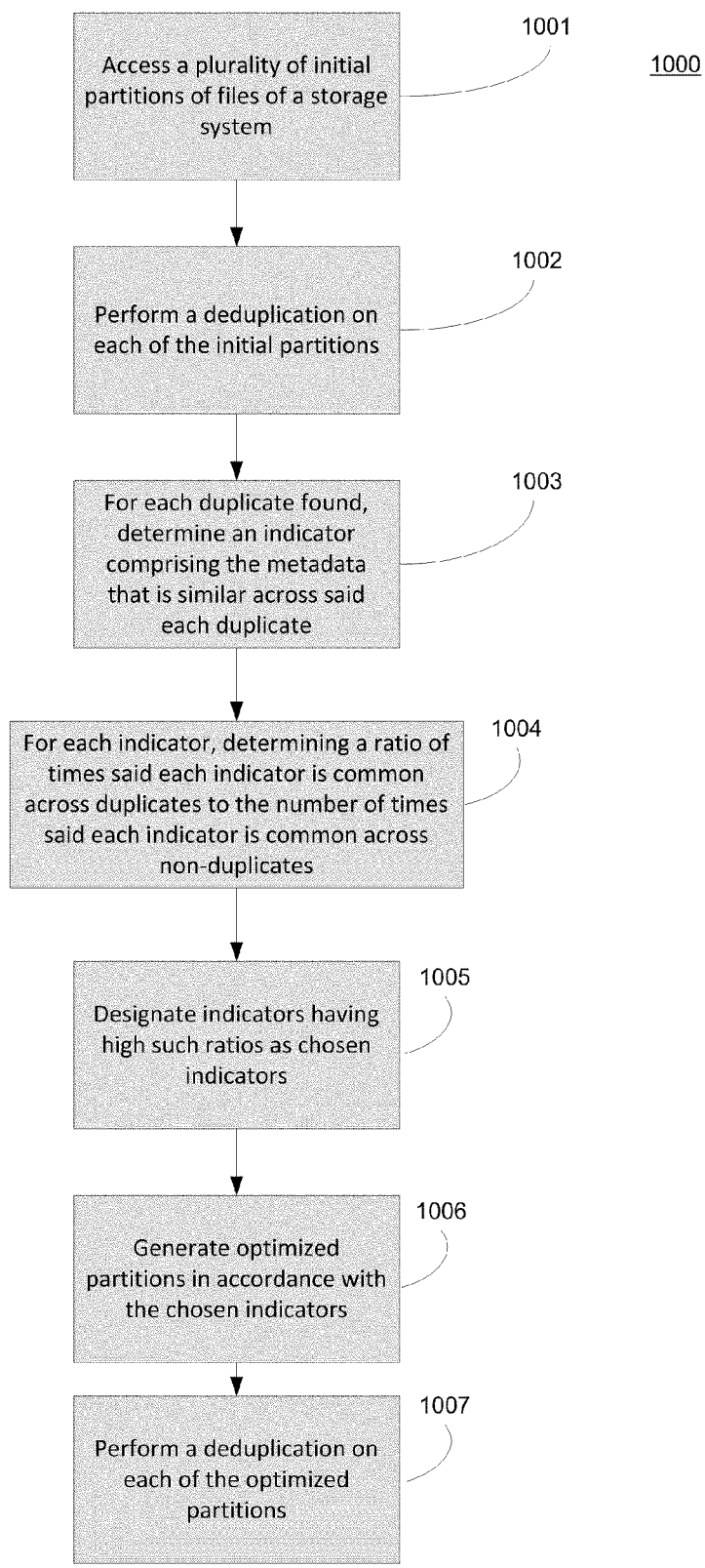
FIG. 10 shows a flow chart of the steps of an exemplary de-duplication process in accordance with one embodiment of the present invention.

FIG. 10 shows a flow chart of the steps of an exemplary de-duplication process 1000 in accordance with one embodiment of the present invention. As depicted in FIG. 10, process 1000 shows the general operating steps of a de-duplication process as it is initializes and generates optimized partitions.

Process 1000 begins in step 1001, where the de-duplication manager accesses a plurality of initial partitions of files of a storage system. As described above, these initial partitions can be randomly selected to provide an adequate representation of the state of the file system. Alternatively, the initial partitions can be user selected based upon user provided metadata. In step 1002, a de-duplication is performed on each of the initial partitions. In step 1003, for each duplicate found, an indicator comprising metadata that is similar across each duplicate is determined. In step 1004, for each indicator, a ratio of the times each indicator is common across duplicates to the number of times each indicator is common across non-duplicates is determined. As described above, the process looks at what object meta-data is common/similar across each of these duplicates. For each initial partition, for each meta-data, the process finds a ratio of the number of times it is common across duplicates to the number of times it is common across non-duplicates. The meta-data that has the highest such ratios (weighted across all the randomly picked initial partitions) are chosen as the meta-data suitable for partitioning.

Thus, in step 1005, indicators having the highest ratios are designated as chosen indicators. In step 1006, optimized partitions are generated in accordance with the chosen indicators. And subsequently, in step 1007, a de-duplication is performed on each of the optimized partitions.

Thus, it can be seen that there are generally 3 stages to the process. The first stage is discovery of one or more meta-data suitable for partitioning. The second stage is partitioning of the metadata for existing data. And the third stage is partitioning of incoming data.

As described above, to discover appropriate meta-data that will serve as indicators for generating optimized partitions, the process can start with user-defined partitions, for example, looking only within each file system, within each pool, etc. Assume a case where there are 1000 such filesystems or backup images i.e. containers. The process can pick say 20-30 random containers from the 1000. Now, the process does de-duplication within each of these containers. For each duplicate, the process looks at what object meta-data is common/similar across each of these duplicates. For each container, for each meta-data, the process finds a ratio of times it is common across duplicates to the number of times it is common across non-duplicates.

The meta-data that has the largest such ratios (weighted across all the randomly picked containers) are chosen as the meta-data suitable for partitioning. The process can do this process iteratively (i.e. next time start with this newly discovered partitions, and continue until it keeps finding meta-data that gives better ratios than the one in previous iterations). The second stage involves creating a new set of partitions based on the newly discovered metadata. The second stage is now described in detail in the discussion of FIG. 11 below.

Figure 11:
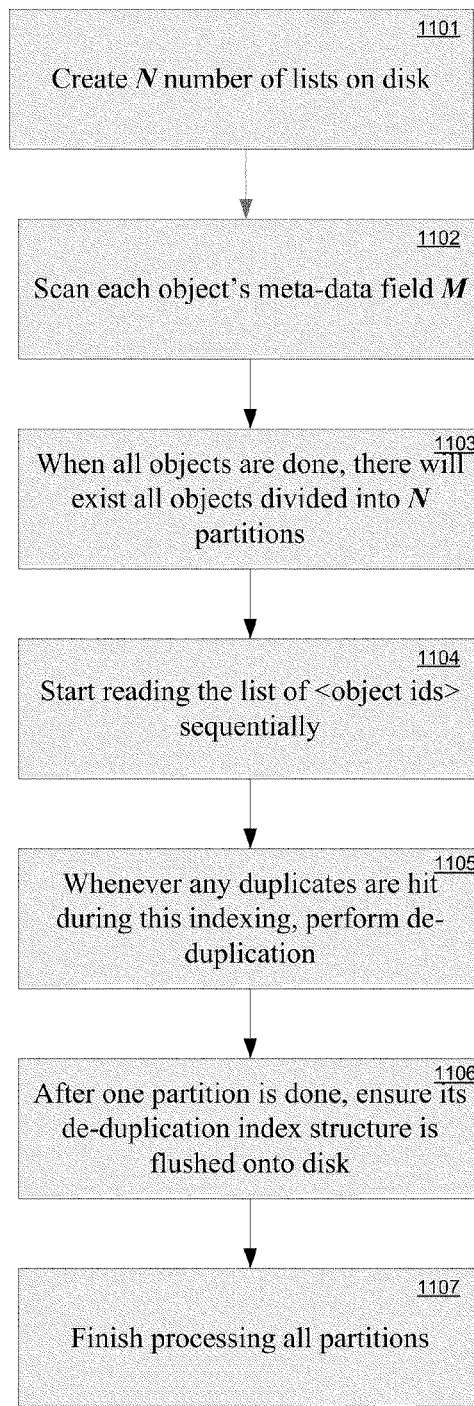
FIG. 11 shows a flow chart of the steps of a process for dividing existing data into partitions in accordance with one embodiment of the present invention.

FIG. 11 shows a flow chart of the steps of a process 1100 for dividing existing data into partitions in accordance with one embodiment of the present invention. As depicted in FIG. 11, process 1100 shows the general operating steps of a de-duplication process as it allocates existing data among the partitions.

Process 1100 begins at step 1101, where N number of lists are created on disk storage. At this point, the first stage i.e. discovery of meta-data is over. In a typical case, the meta-data that has been decided as being most suited for creating partitions is M and number of partitions to be created is N. In step 1101, N number of lists are created on disk. The type of each element in the list is <object id>. Each list will be empty initially. Thus, each list corresponds to a partition and represents the list of objects that fall in the given partition.

In step 1102, each object's meta-data field M is scanned. Depending on the value of M, the object is appended to the appropriate partition's list. In step 1103, thus, when all objects are done, all objects will be divided into N partitions. In step 1104, process 1100 takes one partition at a time, and starts reading the list of <object ids> sequentially. For each object, checksums/hashes are computed and inserted into the de-duplication index structure. Thus, we have a separate de-duplication index structure for each partition.

In step 1105, whenever any duplicates are hit during this indexing, the routine de-duplication processing is performed (e.g., to make sure only one copy of the data gets stored and both objects point to the same data, etc.). In step 1106, after one partition is done, its de-duplication index structure is flushed completely onto disk, and is then removed from memory. Subsequently, in step 1107, process 1100 proceeds to the next partition's list of objects, and continues processing. When all partitions are done, all objects within their partitions will have been de-duplicated.

It should be noted that, if more than one partitioning scheme is desired, steps 1101 to 1103 can be combined for all schemes so that they need to be done only once, and repeat steps 1104 to 1107 separately for each scheme.

It should be noted that step 1102 above requires each object's meta-data to be scanned. But typically, all the meta-data will be stored together in some directory structure or a separate file. For example, in one embodiment, all inodes are stored separately in a file called inodes list. Secondly, if there is some indexing based on the meta-data, that index can simply be used to quickly get all object ids, which have a particular given value of meta-data M. The most important thing here is that even 1000 partitions are being created, each object's meta-data is scanned only once. Any de-duplication scheme, even if it does not provide scalability will need to scan each object once, and thus, extra overhead has not been inserted for scanning. The small extra overhead that may be introduced is related to creating on-disk lists. But again, this overhead is much less. While creating these lists, all that is required to be kept in memory is the tail-end of each list, e.g., just one disk block for each list, since just this list is being appended. Thus, at no point is the entire list of a partition needed.

It should be noted that when multiple partitioning schemes are desired, for example S number of schemes, after the meta-data scan i.e. after step 1103 of the above, the process will end up with S*N number of lists.

It should be noted that when it is said to compute checksums/hashes for each object, it refers to the fact that the computation can either be checksum for the entire object in case of object-level de-duplication, or hash of a portion of the object in case of chunk-level de-duplication.

It should be noted that objects can be deleted from the on-disk per partition list, once they have been inserted into the de-duplication index. At any point of time, the entries from the de-duplication index need to be loaded in-memory of one partition at the maximum. There is no need to load all the entries.

A third stage of the embodiments of the present invention is now described. The third stage is directed towards the partitioning of incoming data. First, as each object enters into the storage system, the partition to which it belongs is quickly determined by a quick in-memory check of its meta-data. Second, that object is added to the on-disk partition list of <object ids>. And third, at regular intervals, each list is read sequentially, and the objects insert corresponding to the <object ids> contained in it, into the de-duplication index. All objects that have been inserted into the index will be deleted from the list.

It should be noted that objects are inserted from the partition list into the de-duplication index only at regular intervals, and not as objects enter the system. The reason is that each of these index structures is quite large. And, for entering each object, multiple disk accesses may be required. Hence, it is preferable to collect thousands of objects belonging to a partition into a list, and then load the de-duplication index of that partition into memory, and insert those thousands of objects into the in-memory de-duplication index in a single operation at a much higher pace of activity.

The new optimized partitions are created automatically. In one embodiment, lists are created where each element of the list is an object ID. Each list corresponds to a partition. Objects are added to a partition by appending them to the appropriate list. The third stage involves examining incoming data. As objects are coming in, the process looks at the object's metadata to decide which list the object should be added to. Objects are then automatically added to the appropriate list.

Although several embodiments of the present invention have been described in the context of files and in the context of a file system, it should be noted that embodiments of the present invention are not limited to operation with a file system and with storing, accessing, serving, or the like, of files. For example, in one embodiment, storage objects are stored, accessed, served or the like for use by the application by a storage object manager (e.g., as opposed to files and a file system). In such an embodiment, the storage object manager processes I/O requests from the application to render caching decisions based the I/O type and/or the storage object type, and selective caching is executed in accordance with the caching decisions.

Figure 12:
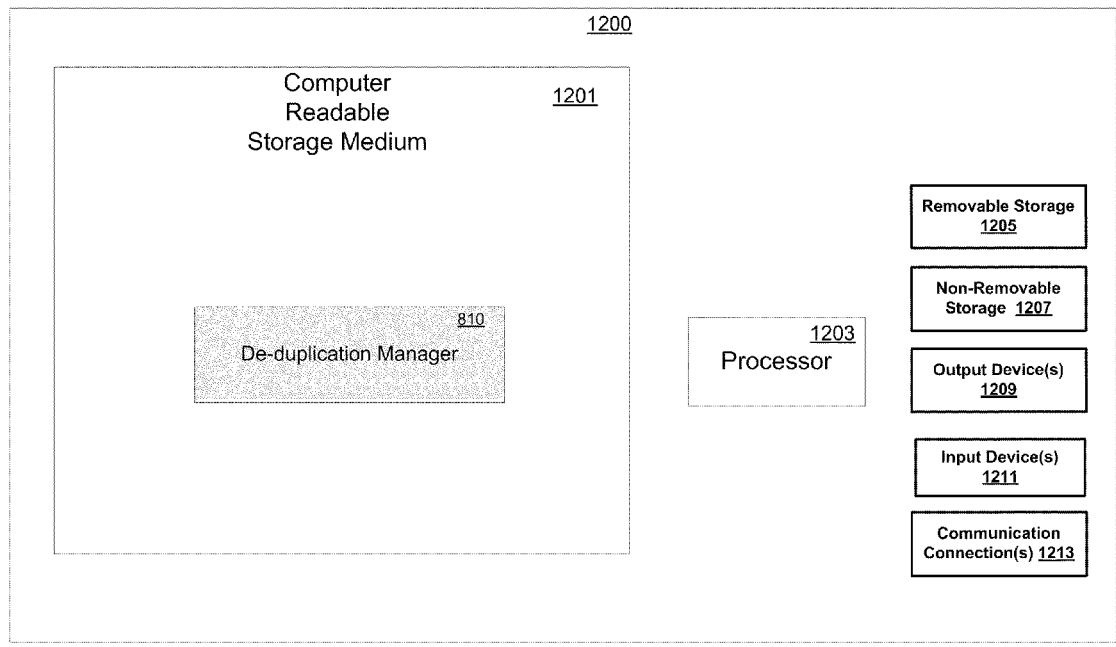
FIG. 12 shows an exemplary computer system according to one embodiment.

FIG. 12 shows an exemplary computer system 1200 according to one embodiment. Computer system 1200 depicts the components of a basic computer system providing the execution environment for certain hardware-based and software-based functionality for the above described embodiments. For example, computer system 1200 can be a system upon which the one or more software stacks and software modules are instantiated. Computer system 1200 can be implemented as, for example, a server computer system, workstation computer system, desktop computer system, or laptop computer system. Similarly, computer system 1200 can be implemented as a handheld device. Computer system 1200 typically includes at least some form of computer readable media (e.g., computer readable storage medium 1201). Computer readable media can be a number of different types of available media that can be accessed by computer system 1200 and can include, but is not limited to, computer storage media.

In its most basic configuration, computer system 1200 typically includes processing unit 1203 and memory 1201. Depending on the exact configuration and type of computer system 1200 that is used, memory 1201 can be volatile (e.g., such as DRAM, etc.) 1201a, non-volatile 1201b (e.g., such as ROM, flash memory, etc.) or some combination of the two. Similarly, the memory 1201 can comprise other devices besides solid-state devices, such as, for example, magnetic disk-based media, optical media, or the like.

Additionally, computer system 1200 can include other mass storage systems (e.g., removable 1205 and/or non-removable 1207) such as magnetic or optical disks or tape. Similarly, computer system 1200 can include input devices 1209 and/or output devices 1211 (e.g., such as a display). Computer system 1200 can further include network connections 1213 to other devices, computers, networks, servers, etc. using either wired or wireless media. As all of these devices are well known in the art, they need not be discussed in detail.

It should further be noted, that the computer system 1200 can have some, most, or all of its functionality supplanted by a distributed computer system having a large number of dispersed computing nodes, such as would be the case where the functionality of the computer system 1200 is partly or wholly executed using a cloud computing environment.

It should be noted that the term "volume" as used herein may refer to any defined amount of storage on one or more storage devices. In addition to its size and the storage device or device on which it is allocated, a volume may, in some cases, have other attributes (e.g. protection/performance features such as mirroring, striping, RAID level, spanning or concatenation etc.). The term volume may include, for example, logical volume as used in Unix-type operating systems such as Linux, AIX from IBM Corp., Solaris from Sun Microsystems, etc. The term volume may also include, for example, a volume as defined by various volume manager software such as VERITAS Volume Manager™ from VERITAS Software Corporation. The term volume may further include a partition as used, e.g., in the Microsoft Windows™ and/or disk operating system (DOS) operating systems. A partition may be a division of storage on a single disk drive, isolating the partitioned storage from other storage on the disk drive. Partitions may be primary or extended. The term volume may further refer to volume groups.

The foregoing description, for the purpose of explanation, has been described with reference to specific embodiments. However, the illustrated discussions above are not intended to be exhaustive or to limit the invention to the precise forms disclosed. Many modifications and variations are possible in view of the above teachings. Embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method for performing storage system de-duplication, comprising:
accessing a plurality of initial partitions of files of a storage system, wherein each of the plurality of initial partitions has object properties;
performing a de-duplication on each of the initial partitions;
for each duplicate partition found from the plurality of initial partitions, determining an indicator comprising metadata that is similar across said each duplicate partition, wherein the metadata is determined based on the object properties of the initial partitions;
for each of the determined indicators, determining a ratio of the number of times the respective metadata is common across duplicate partitions of the initial partitions to the number of times the respective metadata is common across non-duplicate partitions of the initial partitions, wherein the determined indicators having high ratios weighted across all of the initial partitions are designated as chosen indicators;
generating optimized partitions in accordance with the chosen indicators, wherein the chosen indicators are combined to generate the optimized partitions, wherein each optimized partition includes a separate de-duplication index structure, wherein each separate de-duplication index structure is distributed across data servers, and wherein each data server is responsible for performing de-duplication between a subset of the files according to the separate de-duplication index structure; and
performing a de-duplication on each of the optimized partitions.

2. The method of claim 1, wherein the plurality of initial partitions are randomly selected partitions of files of the storage system.

3. The method of claim 1, wherein the chosen indicators enable the generation of optimized partitions in a plurality of different directions across the files of the storage system.

4. The method of claim 1, wherein Boolean operations are used to combine chosen indicators to generate optimized partitions.

5. The method of claim 1, wherein optimized partitions are generated iteratively to detect duplicates within the files of the storage system.

6. The method of claim 1, wherein the de-duplication performed on each of the optimized partitions is performed out of band with respect to the storage system.

7. The method of claim 1, wherein the de-duplication performed on each of the optimized partitions is performed in-band with respect to the storage system.

8. A non-transitory computer readable storage medium having stored thereon computer executable instructions that, if executed by a computer system, cause the computer system to perform a method comprising:
out of a plurality of partitions of files on a file storage system, accessing a plurality of initial partitions, wherein each of the plurality of initial partitions has object properties;
performing a de-duplication on each of the initial partitions;
for each duplicate partition found from the plurality of initial partitions, determining an indicator comprising metadata that is similar across said each duplicate partition, wherein the metadata is determined based on the object properties of the initial partitions;
for each of the determined indicators, determining a ratio of the number of times the respective metadata is common across duplicate partitions of the initial partitions to the number of times the respective metadata is common across non-duplicate partitions of the initial partitions, wherein the determined indicators having high ratios weighted across all of the initial partitions are designated as chosen indicators;
generating optimized partitions in accordance with the chosen indicators, wherein the chosen indicators are combined to generate the optimized partitions, wherein each optimized partition includes a separate de-duplication index structure, wherein each separate de-duplication index structure is distributed across data servers, and wherein each data server is responsible for performing de-duplication between a subset of the files according to the separate de-duplication index structure; and
performing a de-duplication on each of the optimized partitions.

9. The non-transitory computer readable storage medium of claim 8, wherein the plurality of initial partitions are user defined partitions of files of the storage system.

10. The non-transitory computer readable storage medium of claim 8, wherein the chosen indicators enable the generation of optimized partitions in a plurality of different directions across the files of the storage system.

11. The non-transitory computer readable storage medium of claim 8, wherein Boolean operations are used to combine chosen indicators to generate optimized partitions.

12. The non-transitory computer readable storage medium of claim 8, wherein optimized partitions are generated iteratively to detect duplicates within the files of the storage system.

13. The non-transitory computer readable storage medium of claim 8, wherein the de-duplication performed on each of the optimized partitions is performed out of band with respect to the storage system.

14. The non-transitory computer readable storage medium of claim 8, wherein the de-duplication performed on each of the optimized partitions is performed in-band with respect to the storage system.

15. A server computer system, comprising:
a computer system having a computer processor coupled to non-transitory computer readable storage media and executing computer readable code which causes the computer system to:
access a plurality of initial partitions of files of a storage system, wherein each of the plurality of initial partitions has object properties;
perform a de-duplication on each of the initial partitions;
for each duplicate partition found from the plurality of initial partitions, determine an indicator comprising metadata that is similar across said each duplicate partition, wherein the metadata is determined based on the object properties of the initial partitions;
for each of the determined indicators, determining a ratio of the number of times the respective metadata is common across duplicate partitions of the initial partitions to the number of times the respective metadata is common across non-duplicate partitions of the initial partitions, wherein the determined indicators having high ratios weighted across all of the initial partitions are designated as chosen indicators;
generate optimized partitions in accordance with the chosen indicators, wherein the chosen indicators are combined to generate the optimized partitions, wherein each optimized partition includes a separate de-duplication index structure, wherein each separate de-duplication index structure is distributed across data servers, and wherein each data server is responsible for performing de-duplication between a subset of the files according to the separate de-duplication index structure; and
perform a de-duplication on each of the optimized partitions.

16. The server computer system of claim 1, wherein the plurality of initial partitions are randomly selected partitions of files of the storage system.

17. The server computer system of claim 1, wherein the chosen indicators enable the generation of optimized partitions in a plurality of different directions across the files of the storage system.

18. The server computer system of claim 1, wherein Boolean operations are used to combine chosen indicators to generate optimized partitions.

19. The server computer system of claim 1, wherein optimized partitions are generated iteratively to detect duplicates within the files of the storage system.

20. The server computer system of claim 1, wherein a plurality of de-duplication indexes for controlling the de-duplication process are allocated across a corresponding plurality of network connected computer systems.

* * * * *